US012077238B2

(12) United States Patent
Zang

(10) Patent No.: US 12,077,238 B2
(45) Date of Patent: Sep. 3, 2024

(54) FOOT PLATE FOR SELF-BALANCING SCOOTER, AND SELF-BALANCING SCOOTER

(71) Applicant: ZHEJIANG AERLANG TECHNOLOGY CO., LTD., Zhejiang (CN)

(72) Inventor: Chuanmei Zang, Jiangxi (CN)

(73) Assignee: ZHEJIANG AERLANG TECHNOLOGY CO., LTD., Zhejiang (CN)

( * ) Notice: Subject to any disclaimer, the term of this patent is extended or adjusted under 35 U.S.C. 154(b) by 348 days.

(21) Appl. No.: 17/631,541

(22) PCT Filed: Aug. 19, 2020

(86) PCT No.: PCT/CN2020/110104
§ 371 (c)(1),
(2) Date: Jan. 31, 2022

(87) PCT Pub. No.: WO2021/032137
PCT Pub. Date: Feb. 25, 2021

(65) Prior Publication Data
US 2022/0266940 A1 Aug. 25, 2022

(30) Foreign Application Priority Data
Aug. 20, 2019 (CN) .......................... 201921350673.4

(51) Int. Cl.
B62K 11/00 (2006.01)
B62J 25/04 (2020.01)
B62K 11/02 (2006.01)
(52) U.S. Cl.
CPC ............. B62K 11/007 (2016.11); B62J 25/04 (2020.02); B62K 11/02 (2013.01); B62K 2202/00 (2013.01)

(58) Field of Classification Search
CPC .............................. B62K 11/007; B62J 25/04
See application file for complete search history.

(56) References Cited

U.S. PATENT DOCUMENTS

2016/0129963 A1* 5/2016 Ying .................... B62K 11/007
180/6.5
2017/0166278 A1* 6/2017 Lu .......................... B62K 3/002
(Continued)

FOREIGN PATENT DOCUMENTS

CN 205499172 U 8/2016
CN 205854360 U 1/2017
(Continued)

OTHER PUBLICATIONS

International Search Report, issued in PCT/CN2020/110104, dated Nov. 20, 2020.

Primary Examiner — Brian L Swenson
(74) Attorney, Agent, or Firm — Birch, Stewart, Kolasch & Birch, LLP

(57) ABSTRACT

Disclosed are a foot plate for a self-balancing scooter, and a self-balancing scooter. The foot plate (1) for a self-balancing scooter comprises a main body (10) and touch control portions (11). A front side and a rear side of a lower surface of the main body are both connected to the touch control portions, which protrude downwards and are used to trigger a sensor on a self-balancing scooter. The touch control portions at the front side and the rear side of the lower surface of the foot plate for a self-balancing scooter are capable of directly triggering corresponding sensors. The foot plate is applicable to twisting scooters having a left scooter portion and a right scooter portion which are capable of twisting relatively. No additional components are required, and users just need to install the foot plate on a self-balancing scooter. The foot plate has a simple and logic structure, and a self-balancing scooter adopting the foot (Continued)

plate is compact in overall structure, easy to install, convenient to operate, better in control performance, and longer in service life.

18 Claims, 7 Drawing Sheets

(56) References Cited

U.S. PATENT DOCUMENTS

| | | | | |
|---|---|---|---|---|
| 2018/0118297 A1* | 5/2018 | Lu | ........................... | B62K 3/002 |
| 2019/0077479 A1* | 3/2019 | Chen | .................... | B62K 11/007 |
| 2019/0092387 A1* | 3/2019 | Ying | .................... | B62K 11/007 |
| 2019/0176922 A1 | 6/2019 | Chen | | |
| 2019/0256164 A1* | 8/2019 | Yang | ........................ | B62J 50/22 |
| 2019/0337585 A1* | 11/2019 | Ying | ........................ | B62M 6/90 |
| 2019/0382065 A1* | 12/2019 | Shang | ...................... | B62J 50/21 |
| 2020/0354008 A1* | 11/2020 | Wang | ...................... | B62J 43/16 |
| 2022/0024536 A1* | 1/2022 | Chen | ...................... | A63C 17/12 |

FOREIGN PATENT DOCUMENTS

| | | |
|---|---|---|
| CN | 108275228 A | 7/2018 |
| CN | 210338168 U | 4/2020 |
| WO | WO 2017/210830 A1 | 12/2017 |

* cited by examiner

FOOT PLATE FOR SELF-BALANCING SCOOTER, AND SELF-BALANCING SCOOTER

BACKGROUND OF THE INVENTION

1. Technical Field

The invention relates to a foot plate for a self-balancing scooter, and a self-balancing scooter.

2. Description of Related Art

One type of existing self-balancing scooters are self-balancing twisting scooters, which have a left scooter portion and a right scooter portion which are capable of twisting relatively and are provided with a foot plate installed on a frame, touch control portions are installed on the frame directly or through mounting brackets, and horn-shaped deformable portions are disposed on the touch control portions. When standing on the self-balancing scooters, an operator enables the touch control portions to deform by means of the foot plate, so as to trigger a sensor to realize turning control.

BRIEF SUMMARY OF THE INVENTION

In the process of implementing the solution of the application, the inventor realizes that the prior art at least has the following problems: the foot plate, the touch control portions and the frame are inconvenient to install, the touch control portions are complicated in structure, and when installed on a self-balancing scooter, make the overall structure of the self-balancing scooter complicated, and are likely to be worn and get lost and difficult to change; and the self-balancing twisting scooters having a left scooter portion and a right scooter portion capable of twisting relatively are provided with more touch parts, which makes installation more difficult.

The invention relates to a foot plate for a self-balancing scooter, and a self-balancing scooter. The foot plate for a self-balancing scooter is capable of directly triggering a sensor, and is simple and logic in structure. The self-balancing scooter adopting the foot plate is compact in structure and easy to install.

The invention is implemented through the following technical solution:

A foot plate for a self-balancing scooter comprises a main body and touch control portions, wherein a front side and a rear side of a lower surface of the main body are both connected to the touch control portions, which protrude downwards and are used to trigger a sensor on a self-balancing scooter.

By adoption of this technical solution, the touch control portions are integrally disposed at the front side and the rear side of the lower surface of the main body, and are capable of directly triggering a corresponding sensor when applied to a self-balancing twisting scooter having a left scooter portion and a right scooter portion capable of twisting relatively, no additional components are required, and users just need to install the foot plate on a self-balancing scooter; and the foot plate has a simple and logic structure.

As a further improvement of the invention, lower portions of the touch control portions are flat. By adoption of this technical solution, the lower portions of the touch control portions are of a flat sheet structure and fit the sensor, so that the sensor can be triggered by the touch control portions. In case where the sensor is a photoelectric switch, the flat touch control portions can effectively shield a light beam in the moving process to trigger the sensor intelligently. In other solutions, the touch control portions may be in other shapes as long as the touch control portions can shield the light beam from the sensor.

As a further improvement of the invention, first elastic element abutting portions are disposed around upper portions of the touch control portions. By adoption of this technical solution, the elastic elements can abut against the first elastic element abutting portions. In other embodiments such as the previous solution, the elastic elements may directly abut against the main body.

As a further improvement of the invention, the cross-section of the upper portions of the touch control portions is cross-shaped, T-shaped or circular. By adoption of this technical solution, the cross-section of the upper portions of the touch control portions is cross-shaped, so that the structural strength of the touch control portions is improved, and the stability of the flat lower portions of the touch control portions is maintained to ensure that the touch control portions are able to trigger the sensor stably.

As a further improvement of the invention, a periphery of the main body is connected to a first convex edge which protrude downwards; within a range defined by the first convex edge, a second convex edge which protrudes downwards is disposed on the lower surface of the main body; and the touch control portions are located within a range defined by the second convex edge. By adoption of this technical solution, the first convex edge and the second convex edge are arranged to facilitate the installation of the foot plate, and when installed on a self-balancing scooter, the foot plate will not move horizontally, and the touch control portions are able to trigger the sensor accurately.

As a further improvement of the invention, mounting posts which protrude downwards are disposed on the lower surface of the main body, and threaded holes are formed in the mounting posts. By adoption of this technical solution, the foot plate can be easily installed on an upper frame through the mounting posts of such a structure, and after the foot plate is placed on the upper frame, fasteners are directly screwed into the mounting posts to install the foot plate on the upper frame, and the foot plate is unlikely to fall from the upper frame.

A self-balancing scooter comprises the foot plates for a self-balancing scooter according to any one of the above-mentioned solutions, and further comprises elastic elements, upper frames and sensors, wherein the foot plates are mounted on the upper frames, the elastic elements are located between the upper frames and the foot plates, upper ends of the elastic elements are connected to or abut against the foot plates, lower ends of the elastic elements are connected to or abut against the upper frames, and the sensors are located below the touch control portions. By adoption of this technical solution, the touch control portions are able to trigger the sensors to enable the self-balancing scooters to fulfill corresponding functions, the sensors are used to control the self-balancing scooter to turn, and the foot plates are able to return to the initial state in time by means of the elastic elements when no one stands on the self-balancing scooter.

As a further improvement of the invention, receiving cavities which are concaved downwards are formed in a front side and a rear side of each upper frame, protruding portions which protrude downwards are disposed on a lower surface of each upper frame and are cavity walls of the receiving cavities, second elastic element abutting portions which are concaved inwards are disposed at bottoms of the protruding portions, first through holes allowing the touch control portions to move upwards or downwards are formed in the second elastic element abutting portions and are communicated with the receiving cavities, the sensors are photoelectric switches which are installed on circuit boards, and the circuit boards are installed on lower surfaces of the upper frames. By adoption of this technical solution, the receiving cavities are arranged to receive the elastic elements to facilitate the restoration of the foot plates, the elastic elements can abut against the second elastic element abutting portions, and the touch control portions can move upwards or downwards through the first through holes to trigger the photoelectric switches below the first through holes.

As a further improvement of the invention, edges, close to the first through holes, of the second elastic element abutting portions are provided with convex edges which protrude upwards. By adoption of this technical solution, the convex edges are arranged to limit the elastic elements, so that the elastic elements are prevented from moving horizontally in when compressed, which may otherwise disturb the touch control portions.

As a further improvement of the invention, the upper frames are formed with grooves which are concaved downwards, and the grooves fit outer edges of the foot plates in shape; the upper frames are also formed with second through holes; and fixing posts for installing the circuit boards are disposed on the lower surfaces of the upper frames. By adoption of this technical solution, the first convex edges and the second convex edges on the foot plates can be clamped in the grooves, the mounting posts on the foot plates can be inserted into the second through holes, and the fixing posts can facilitate the installation of the circuit boards.

Compared with the prior art, the invention at least has the following beneficial effects: as for the foot plate, on the one hand, the touch control portions at the front side and the rear side of the lower surface of the main body are capable of directly triggering a sensor below, no additional components are required, users just need to install the foot plate on a self-balancing scooter, and the foot plate has a simple and logic structure; on the other hand, the foot plate is easy to machine, lower in cost, and suitable wide application and promotion; and the self-balancing scooter is more reasonable in overall structure, simpler and more compact in structure, better in control performance, and longer in service life.

To gain a better understanding of the above and other purposes, features and advantages of the invention, a detailed description is given below with reference to preferred embodiments and accompanying drawings.

In the figures: 1, foot plate; 10, main body; 11, touch control portion; 111, rib plate; 12, first elastic element abutting portion; 13, mounting post; 14, rib strip; 15, first convex edge; 16, second convex edge; 17, notch; 18, friction portion; 2, upper frame; 21, protruding portion; 211, first through hole; 212, second elastic element abutting portion; 22, fixing post; 23, receiving cavity; 24, second through hole; 25, groove; 3, circuit board; 4, elastic element; 5, lower frame.

DETAILED DESCRIPTION OF THE INVENTION

To further expound the technical means and effects adopted by the invention to fulfill desired purposes, the specific implementations, structures, features and effects of the invention will be explained in detail below in conjunction with the accompanying drawings and preferred embodiments.

It should be understood that the terms such as "upper", "lower", "front", "rear", "left", "right", "inner" and "outer" in the description of the invention are used to indicate directional or positional relations based on the accompanying drawings merely for the purpose of facilitating and simplifying the description of the application, do not indicate or imply that a device or element referred to must be in a specific direction or be configured and operated in a specific direction, and thus should not be appreciated as limitations of the application.

In addition, the terms "first" and "second" are merely for the purpose of description, should not be understood as indicating or implying relative importance or implicitly indicating the number of technical features referred to. So, a feature defined by "first" or "second" may explicitly or implicitly indicate the inclusion of one or more said feature. Unless otherwise clearly and specifically defined, "multiple" in the description of the application means two or more.

Unless otherwise clearly specified and defined, the terms such as "install", "link" "connect", and "fix" in the application should be broadly understood. For example, "connect" may refer to fixed connection, detachable connection or integrated connection; or, mechanical connection or electrical connection; or, direct connection, indirect connection by means of an intermediate medium, or internal communication of two elements. Those ordinarily skilled in the art may appreciate the specific meaning of these terms in the application as the case may be.

Embodiment 1

Figure 1:
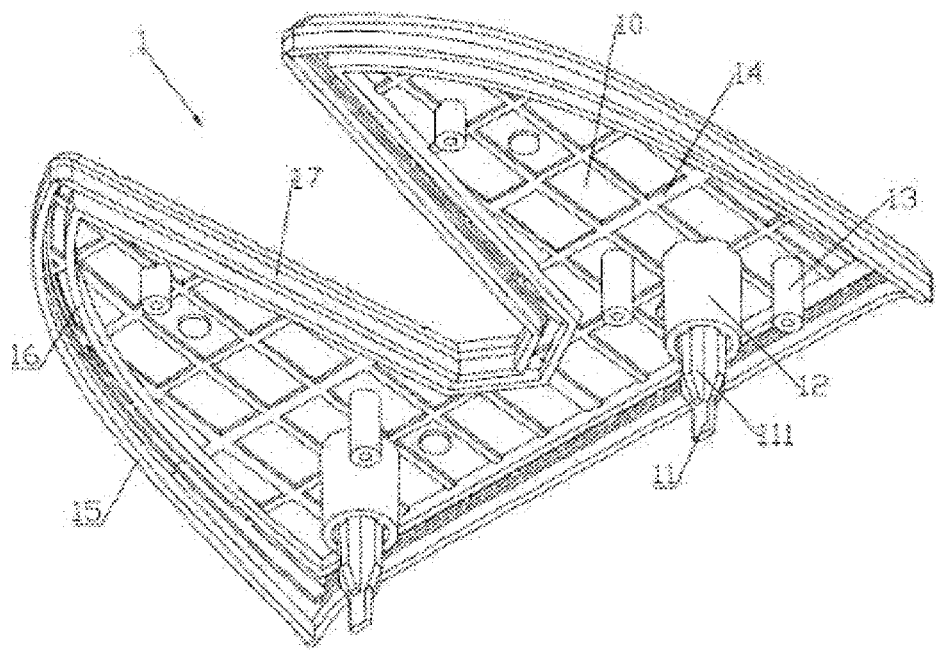
FIG. 1 is a structural diagram of a lower surface of a foot plate for a self-balancing scooter according to Embodiment 1 of the invention.

This embodiment provides a foot plate for a self-balancing scooter. As shown in FIG. 1, the foot plate 1 comprises a main body 10, touch control portions 11, first elastic element abutting portions 12, a first convex edge 15, a second convex edge 16, and mounting posts 13. The main body 10 is of a plate structure. A front side and a rear side of a lower surface of the main body 10 are connected to the flat touch control portions 11, which protrude downwards. The first elastic element abutting portions 12 are disposed around upper portions of the touch control portions 11, and the top of each first elastic element abutting portion 12 is connected to the lower surface of the main body 10. A periphery of the main body 10 is connected to the first convex edge 15 which protrudes downwards. In a space defined by the first convex edge 15, the second convex edge 16 which protrudes downwards is also connected to the main body 10. The mounting posts 13 are connected to the lower surface of the main body 10.

The foot plate 1 may be formed integrally. In other embodiments, the foot plate 1 may consist of a soft pedal cover and a rigid pedal mat, wherein the pedal cover is attached to the pedal mat, the main body is located at the position where the pedal cover is attached to the pedal mat, the first convex edge and the second convex edge are located on the pedal cover, and the mounting posts, the first elastic element abutting portions 12 and the touch control portions 11 are located on the pedal mat.

Referring to FIG. 1, lower portions of the touch control portions 11 are of a flat sheet structure and are used to trigger a sensor on the self-balancing scooter. The cross-section of upper portions of the touch control portions is cross-shaped, T-shaped or circular, the upper portions of the touch control portions 11 are large, the lower portions of the touch control portions 11 are small, and the upper portions are in connection and transition with the lower portions through inclined planes. In this embodiment, the upper portions of the touch control portions 11 are provided with flat rib plates 111 which extend downwards. A flat direction of the rib plates 111 is perpendicular to a flat direction of the lower portions of the touch control portions 11, that is, the cross-section of the upper portions of the touch control portions is cross-shaped. A peripheral size of the cross-section of the rib plates is smaller than that of the cross-section of the first elastic element abutting portions 12. Bottom surfaces of the rib plates 111 are inclined surfaces, so that elastic elements (such as springs) can be easily disposed around the rib plates 111. Lowest points of the inclined surfaces of the rib plates 111 are higher than the bottom surfaces of the touch control portions 11, so that the sensor can be easily triggered by the touch control portions 11. In other embodiments, the lower portions of the touch control portions 11 are in a flat shape; the upper portions of the touch control portions 11 may be in other shapes, for example, the upper portions of the touch control portions 11 are in a columnar shape, or the cross-section of the upper portions of the touch control portions 11 is T-shaped. A peripheral size of the cross-section of the columnar upper portions of the touch control portions 11 is smaller than that of the first elastic element abutting portions 12, so that the springs can be easily disposed around the columnar portions and can abut against the first elastic element abutting portions.

The first elastic element abutting portions 12 are in a columnar shape, and the cross-section of the first elastic element abutting portions 12 is in the shape of a circular ring. In other embodiments, the first elastic element abutting portions 12 may be in other columnar shapes, such as a prism shape. Upper portions of the first elastic element abutting portions 12 are connected to the lower surface of the main body 10, the upper portions of the touch control portions 11 are located in a circular ring defined by the first elastic element abutting portions 12, and the periphery of the rib plates and the periphery of the touch control portions are both connected to inner walls of the first elastic element abutting portions 12. In other embodiments, the first elastic element abutting portions 12 may be omitted, upper ends of the touch control portions 11 are connected to the main body, the elastic elements are disposed around the touch control portions 11, and upper ends of the elastic elements directly abut against the main body 10.

Inner threaded holes are formed in the mounting posts 13 and allow fasteners (such as screws) to be screwed therein. Rib strips 14 which intersect with each other vertically and horizontally are disposed on the lower surface of the main body 10, so that the strength of the foot plate is improved.

Figure 2:
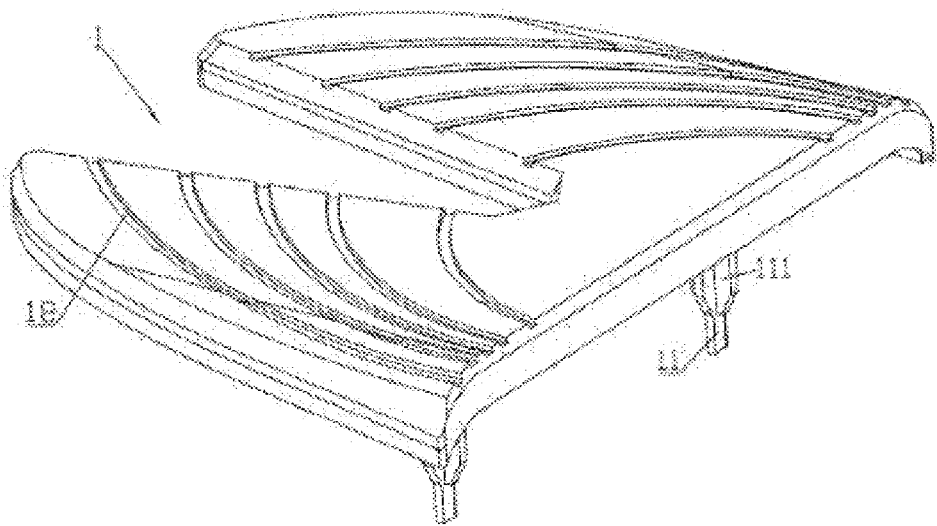
FIG. 2 is a structural diagram of an upper surface of the foot plate for a self-balancing scooter in FIG. 1.

As shown in FIG. 2, the foot plate 1 is formed with notches 17, arc-shaped friction portions 18 are disposed on an upper surface of the main body, and the friction portions 18 are grooves or protrusions.

Embodiment 2

Figure 3:
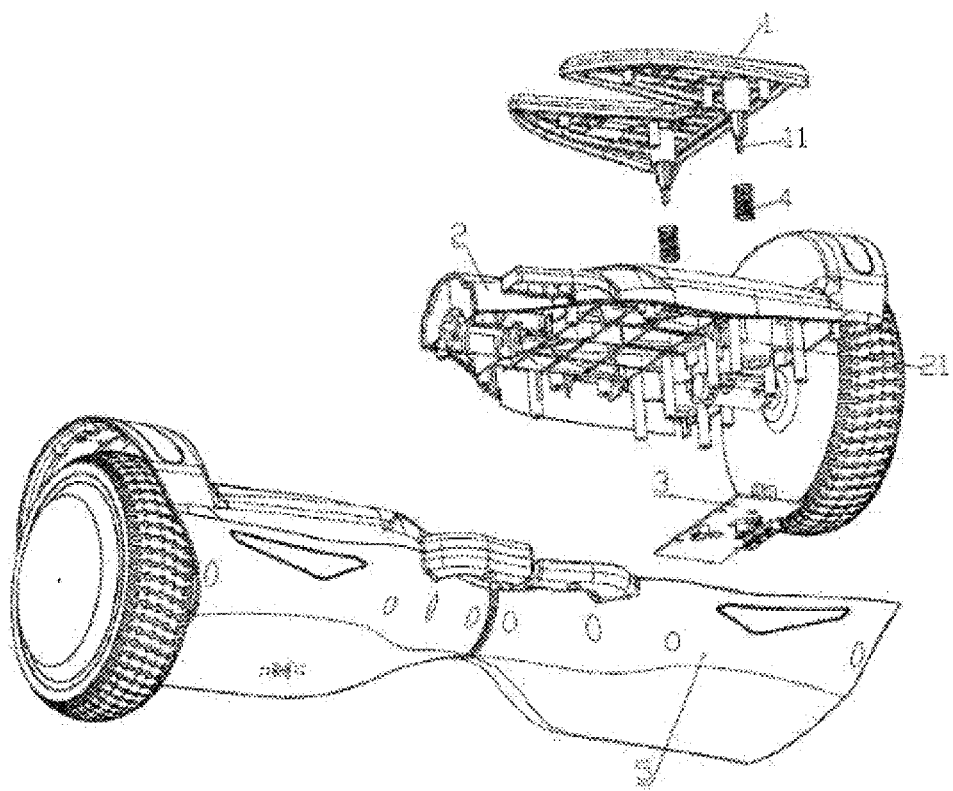
FIG. 3 is an exploded view of a right scooter portion of a self-balancing scooter according to Embodiment 2 of the invention.
Figure 4:
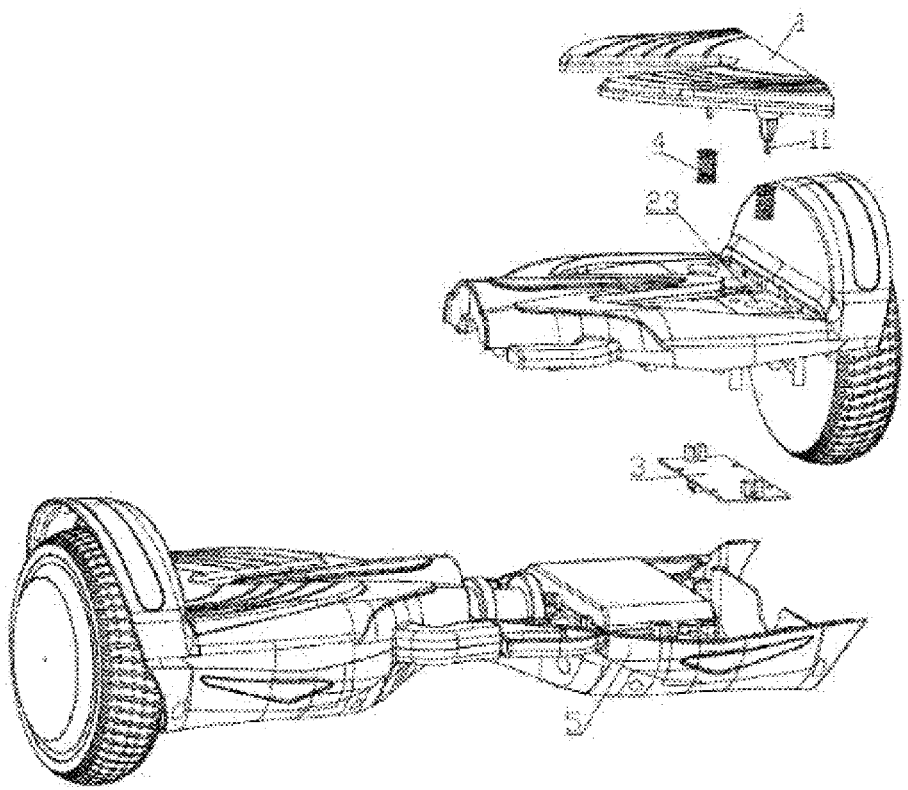
FIG. 4 is an exploded view of the right scooter portion in FIG. 3 from another perspective.

As shown in FIG. 3 and FIG. 4, a self-balancing scooter comprises a left scooter portion and a right scooter portion, wherein the left scooter portion and the right scooter portion are connected and are capable of twisting relatively. The left scooter portion and the right scooter portion each comprise an upper frame 2, elastic elements 4, a sensor, a lower frame 5, a wheel, and the foot plate 1 described in Embodiment 1. The right scooter portion is described by way of example. The foot plate 1 is mounted on the upper frame 2. The elastic elements 4 are springs and are located between the upper frame 2 and the foot plate 1 and disposed around the rib plates 111 on the touch control portions 11, upper ends of the elastic elements 4 abut against the first elastic element abutting portions 12 on the foot plate 1, and lower ends of the elastic elements 11 abut against the upper frame 2. The sensor is installed on a circuit board 3, which is installed on fixing posts 22 below the upper frame 2 through fasteners, and the sensor on the circuit board 3 is located below the touch control portions 11. In other embodiments, the sensor may be directly installed on the frame as long as the sensor is located below the touch control portions 11, that is, the sensor is located in the moving direction of the touch control portions and can be triggered by the touch control portions. After being assembled together, the upper frame 2 and the lower frame 5 are installed through fasteners.

Figure 8:
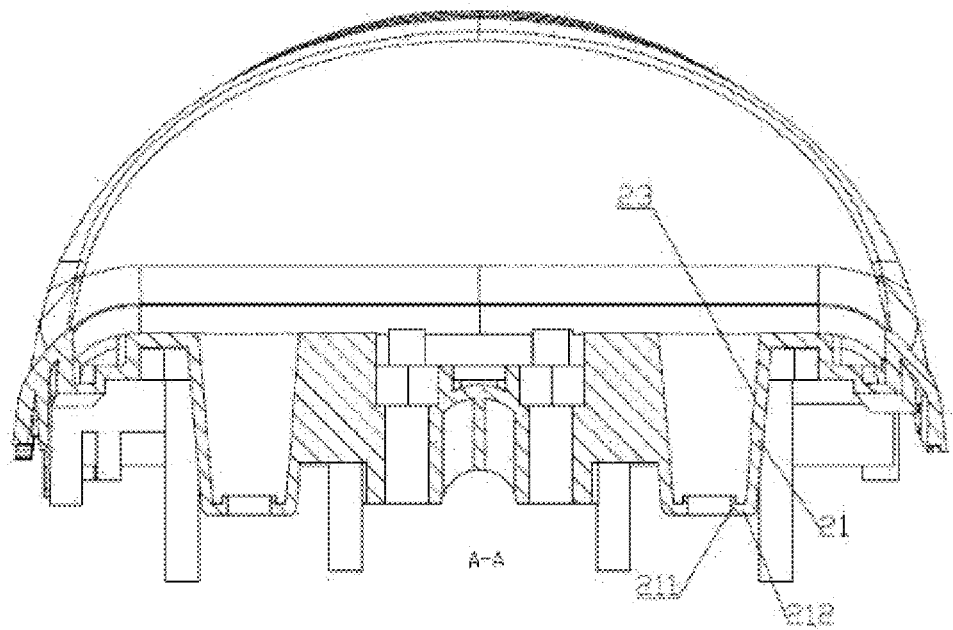
FIG. 8 is a sectional view along A-A in FIG. 7.
Figure 9:
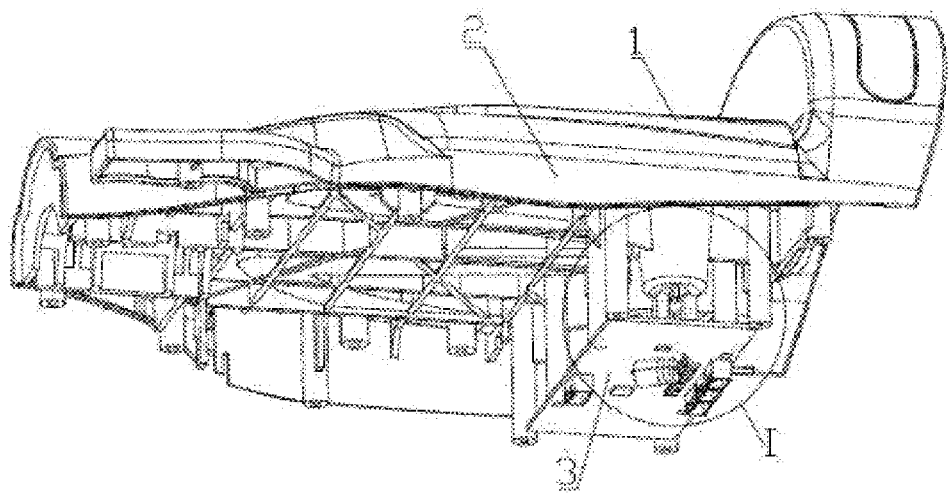
FIG. 9 is a partial structural view of a foot plate and a circuit board installed on the upper frame according to Embodiment 2 of the invention.
Figure 10:
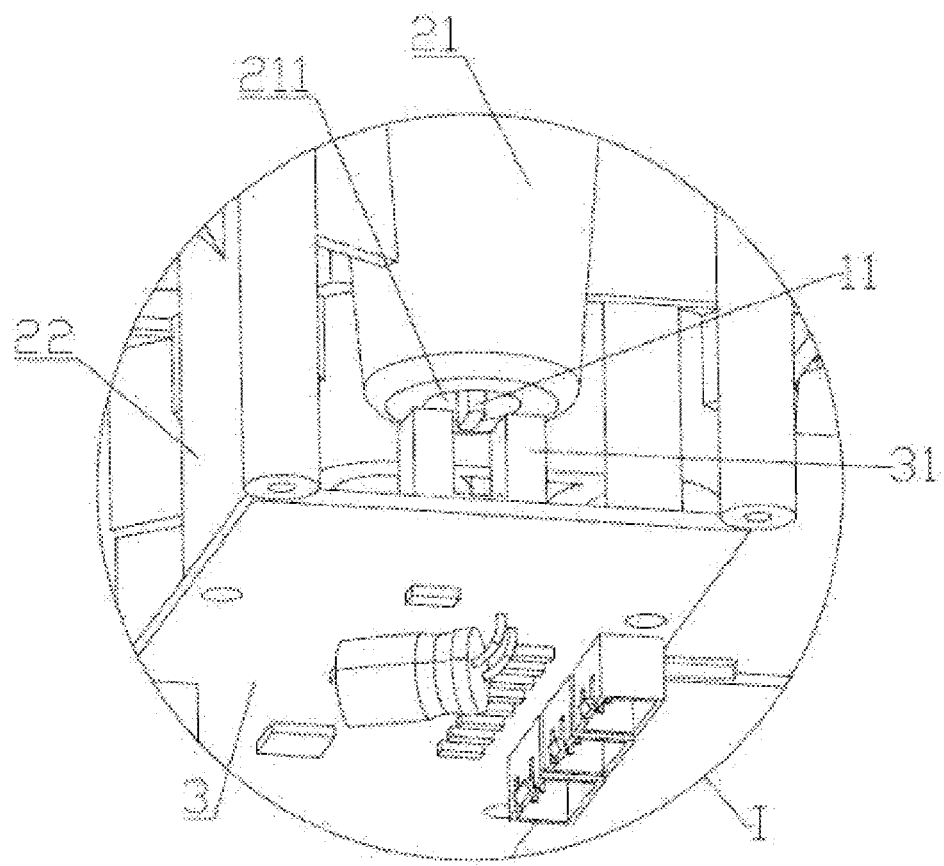
FIG. 10 is an enlarged view of part I in FIG. 9.
Figure 11:
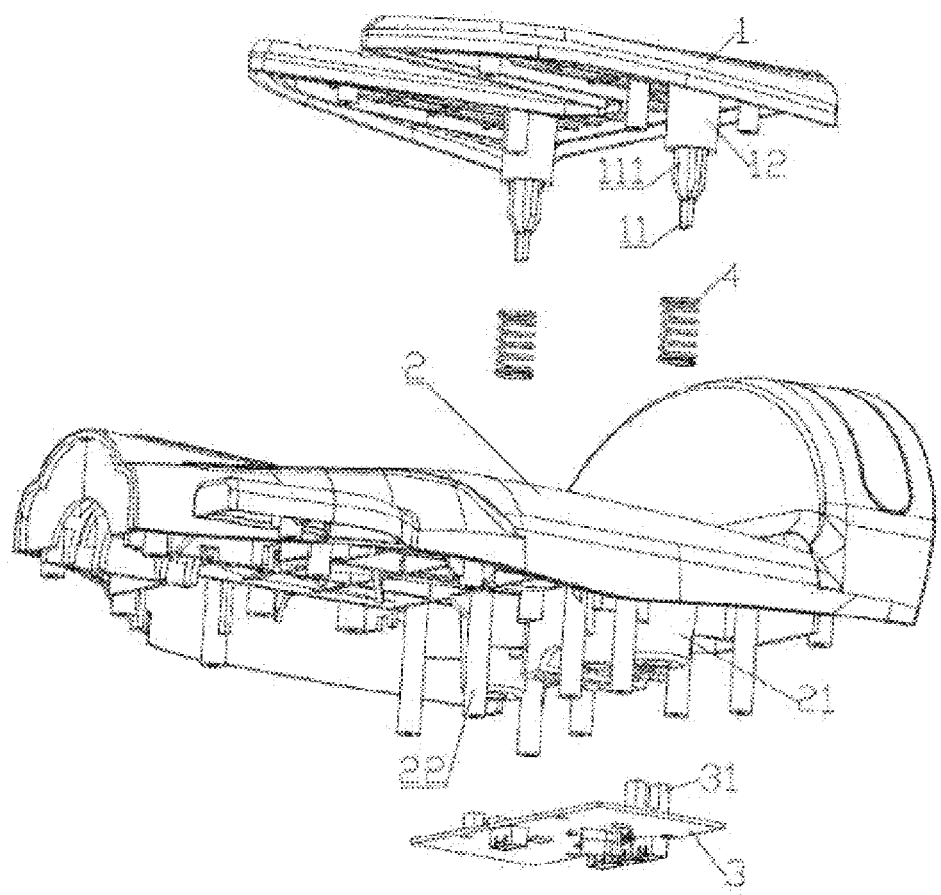
FIG. 11 is an exploded partial structural view of a right scooter portion according to Embodiment 2 of the invention.
Figure 12:
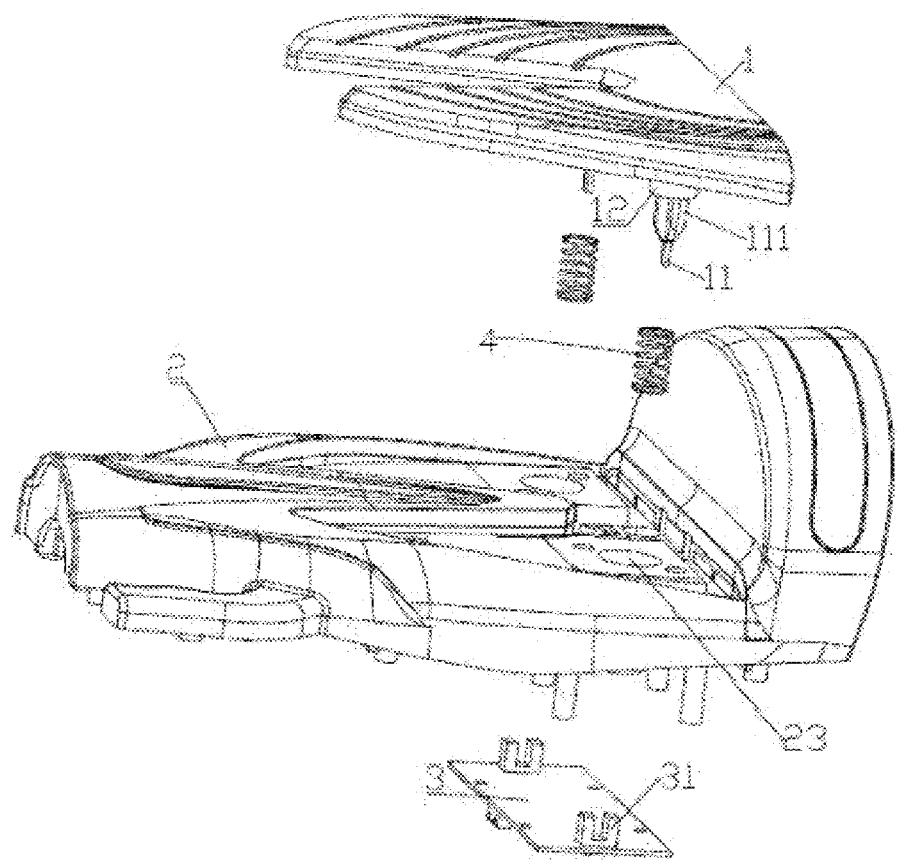
FIG. 12 is an exploded structural view of FIG. 11 from another perspective.

As shown in FIG. 5 to FIG. 8, receiving cavities 23 which are concaved downwards are formed in a front side and a rear side of the upper frame 2 and are used to receive the elastic elements 4, and the receiving cavities 23 are taper holes which become smaller from top to bottom. Referring to FIG. 4, tapered protruding portions 21 which protrude downwards are disposed on a lower surface of the upper frame 2, and are cavity walls of the receiving cavities 23. Referring to FIG. 8, second elastic element abutting portions 212 which are concaved inwards are disposed at the bottoms of the protruding portions 21, and the lower ends of the elastic elements abut against the second elastic element abutting portions 212; and first through holes 211 are formed in the second elastic element abutting portions 212 and are located in the bottoms of the protruding portions 21, and the bottoms of the touch control portions 212 penetrate through the first through holes 211. The first through holes 211 are communicated with the receiving cavities 23 and are located in the center of the second elastic element abutting portions 212, and convex edges which protrude upwards are disposed on edges, close to the through holes 211, of the second elastic element abutting portions 212, and are used to limit the elastic elements. Second through holes 24 allowing the mounting posts 13 to penetrate through are formed in the upper frame 2 and are located in the periphery of the receiving cavities 23. Two second through holes 24 are symmetrically formed in the periphery of each receiving cavity 23, so that the foot plate 1 can be installed steadily. The mounting posts 13 are matched with the second through holes 24 to fulfill a guiding effect to ensure that the foot plate 1 can move steadily.

Figure 5:
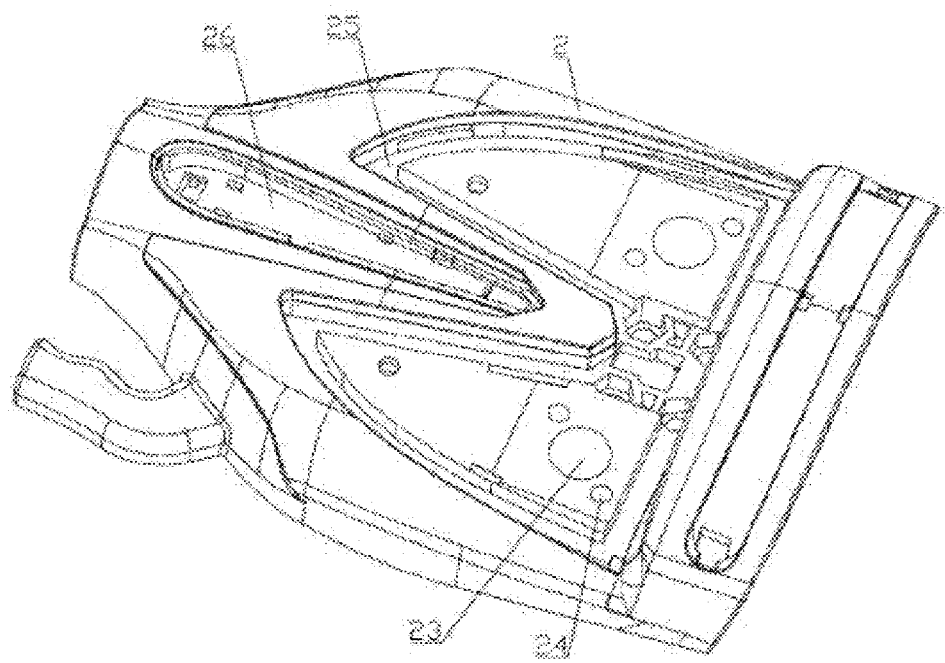
FIG. 5 is a structural diagram of an upper surface of an upper frame of the self-balancing scooter according to Embodiment 2 of the invention.
Figure 6:
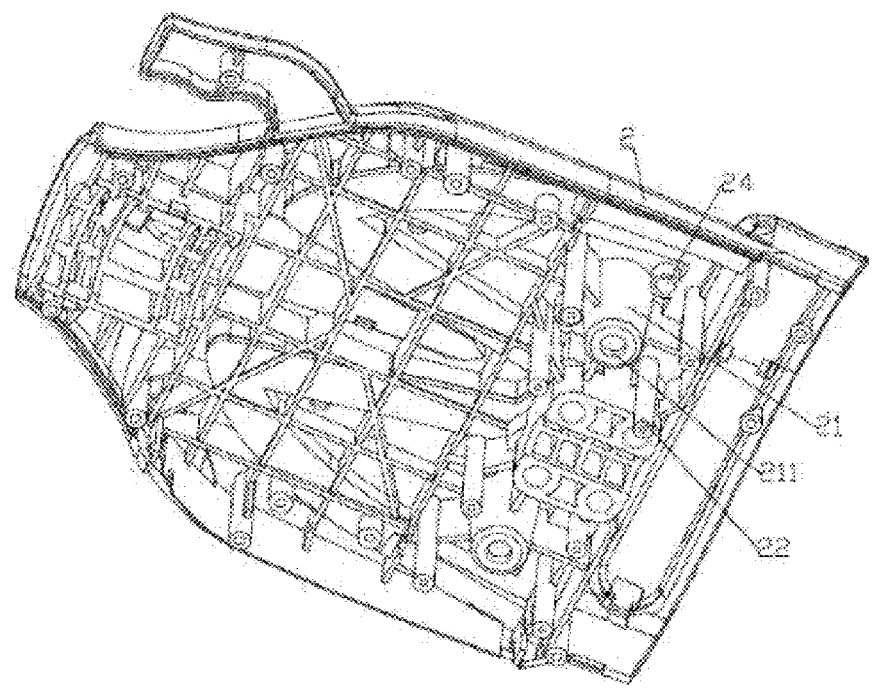
FIG. 6 is a structural diagram of a lower surface of the upper frame of the self-balancing scooter in FIG. 5.
Figure 7:
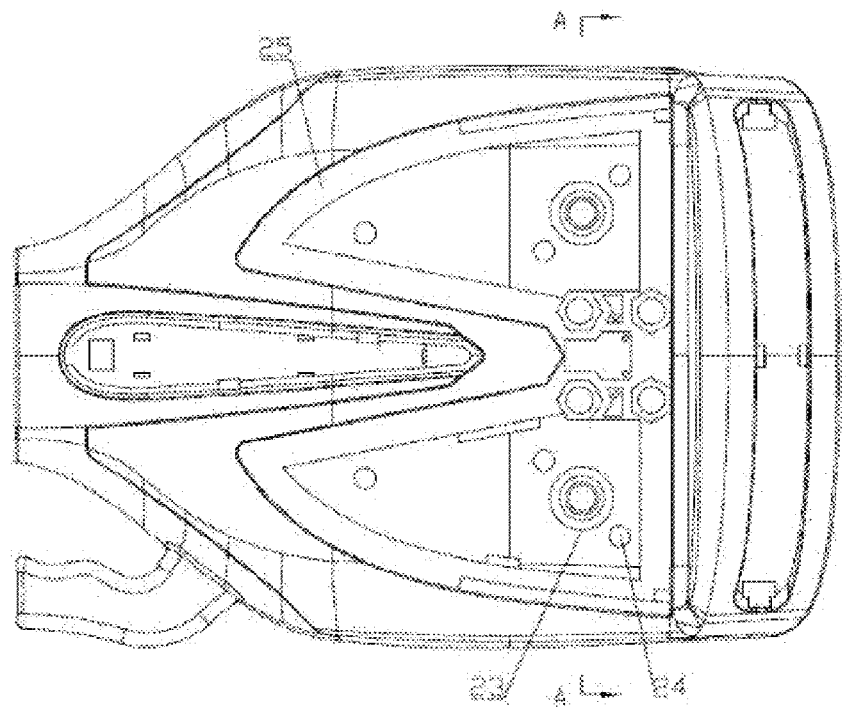
FIG. 7 is a top view of the upper frame of the self-balancing scooter according to Embodiment 2 of the invention.

As shown in FIG. 5, grooves 25 for receiving the first convex edge 15 and the second convex edge 16 of the foot plate, and a mounting groove 26 for mounting a display device (capable of displaying electric quantity information or other information) are formed in the upper frame 2. The mounting groove 26 is formed in a left-right direction and extends into an area where the foot plate is located. The notches 17 in the foot plate are kept away from the mounting groove 26, so that the foot plate 1 and the display device can be installed smoothly.

Referring to FIG. 9 to FIG. 12, a photoelectric switch 31 (one type of sensors) is installed on an upper surface of the circuit board 3. The photoelectric switch is short for photoelectric proximity switch, and is connected to a circuit by means of a synchronizing circuit to detect whether a detected object exists according to the shielding or reflection of a light beam by the detected object. In this embodiment, the photoelectric switch 31 is an opposite-type photoelectric switch, and the touch control portions 11 can be inserted into a gap in the opposite-type photoelectric switch to shield the light beam to trigger the switch.

When installed, the circuit board 3 is screwed on the fixing posts 22 on the lower surface of the upper frame 2 through the fasteners 5, and the photoelectric switch 31 on the circuit board 3 is aligned to the first through holes 211. The foot plate 1 is installed on the upper surface of the upper frame 2, and the first convex edge 15 and the second convex edge 16 are inlaid in the grooves 25. The springs are disposed around the rib plates 111 on the touch control portions 11, with one end abutting against the first elastic element abutting portions 12 on the foot plate 1 and the other end abutting against the second elastic element abutting portions 212 on the upper frame 2. The mounting posts 13 penetrate through the second through holes 24, the bottoms of the mounting posts 13 are exposed out of the second through holes 24, screws are screwed into the mounting posts 13, and the dimension of the head of the screws screwed into the mounting posts 13 is greater than the diameter of the second through holes 24, so that the foot plate 1 is prevented from being detached from the upper frame 2. The touch control portions 11 on the foot plate are exposed via the first through holes 211 to be located above the photoelectric switch 31, that is, the photoelectric switch 31 is located on a moving path of the touch control portions 11, and the touch control portions 11 can move downwards to shield a light beam from the photoelectric switch 31 so as to trigger the photoelectric switch 31 to generate a corresponding scooter control signal.

Of course, the complete self-balancing scooter further comprises a battery, a control panel, a gyroscope and the like, which is a common setting in the art and will no longer be detailed. When the self-balancing scooter is used, an operator stands on the foot plates 1; the operator controls the scooter portions to incline forwards or backwards to make the self-balancing scooter to move forwards or backwards, and applies force to the foot plates 1 to control the self-balancing scooter to turn, such as to turn left. Specifically, when the operator applies force to the right foot plate with the right tiptoe, the touch control portions 11 on the right foot plate will trigger the photoelectric switch 31 at the front side of the right scooter portion; when the operator applies force to the left foot plate with the left tiptoe, the touch control portions at the rear side of the left foot plate will trigger the photoelectric switch 31 on the rear side of the left scooter portion; and then, the control panel controls the self-balancing scooter to turn left according to a signal. The self-balancing scooter can turn right in a similar way, and details will no longer be given.

The foot plate for a self-balancing scooter, and the self-balancing scooter of the invention are logic in structure, reasonable in design, and are industrially applicable.

The above embodiments are merely preferred ones of the invention, and are not intended to limit the invention in any form. Although the invention has been disclosed above with reference to preferred embodiments, the invention is not limited to these embodiments, and any skilled in the art can make changes or modifications to the technical contents disclosed above to obtain equivalent embodiments. Any simple amendments, equivalent changes and modifications made to the above embodiments according to the technical essence without departing from the contents of the technical solution of the invention should also fall within the scope of the technical solution of the invention.

What is claimed is:

1. A foot plate for a self-balancing scooter, wherein the foot plate (1) comprises a main body (10) and touch control portions (11), and a front side and a rear side of a lower surface of the main body (10) are both connected to the touch control portions (11), which protrude downwards and are used to trigger a sensor on a self-balancing scooter,
wherein first elastic element abutting portions (12) are disposed around upper portions of the touch control portions (11).

2. The foot plate for a self-balancing scooter according to claim 1, wherein lower portions of the touch control portions (11) are flat.

3. The foot plate for a self-balancing scooter according to claim 1, wherein a cross-section of the upper portions of the touch control portions (11) is cross-shaped, T-shaped or circular.

4. The foot plate for a self-balancing scooter according to claim 1, wherein mounting posts (13) which protrude downwards are disposed on the lower surface of the main body (10), and threaded holes are formed in the mounting posts (13).

5. A foot plate for a self-balancing scooter, wherein the foot plate (1) comprises a main body (10) and touch control portions (11), and a front side and a rear side of a lower surface of the main body (10) are both connected to the touch control portions (11), which protrude downwards and are used to trigger a sensor on a self-balancing scooter,
wherein a periphery of the main body (10) is connected to a first convex edge (15) which protrude downwards; within a space defined by the first convex edge (15), a second convex edge (16) which protrudes downwards is disposed on the lower surface of the main body (1); and the touch control portions (11) are located within a space defined by the second convex edge (16).

6. The foot plate for a self-balancing scooter according to claim 5, wherein lower portions of the touch control portions (11) are flat.

7. The foot plate for a self-balancing scooter according to claim 5, wherein first elastic element abutting portions (12) are disposed around upper portions of the touch control portions (11).

8. The foot plate for a self-balancing scooter according to claim 5, wherein a cross-section of the upper portions of the touch control portions (11) is cross-shaped, T-shaped or circular.

9. The foot plate for a self-balancing scooter according to claim 5, wherein mounting posts (13) which protrude downwards are disposed on the lower surface of the main body (10), and threaded holes are formed in the mounting posts (13).

10. A self-balancing scooter, comprising
foot plates, wherein each of the foot plates comprises a main body (10) and touch control portions (11), and a front side and a rear side of a lower surface of the main body (10) are both connected to the touch control portions (11), which protrude downwards and are used to trigger a sensor on a self-balancing scooter; and
elastic elements (4), upper frames (2) and sensors, wherein the foot plates (1) are mounted on the upper frames (2), the elastic elements (4) are located between the upper frames (2) and the foot plates (1), upper ends of the elastic elements (4) are connected to or abut against the foot plates (1), lower ends of the elastic elements (4) are connected to or abut against the upper frames (2), and the sensors are located below the touch control portions (11).

11. The self-balancing scooter according to claim 10, wherein receiving cavities (23) which are concaved downwards are formed in a front side and a rear side of each said upper frame (2), protruding portions (21) which protrude downwards are disposed on a lower surface of each said upper frame (2) and are cavity walls of the receiving cavities (23), second elastic element abutting portions (212) which are concaved inwards are disposed at bottoms of the protruding portions (21), first through holes (211) allowing the touch control portions (11) to move upwards or downwards are formed in the second elastic element abutting portions (212) and are communicated with the receiving cavities (23), the sensors are photoelectric switches (31) which are installed on circuit boards (3), and the circuit boards (3) are installed on lower surfaces of the upper frames (2).

12. The self-balancing scooter according to claim 11, wherein edges, close to the first through holes (211), of the second elastic element abutting portions (212) are provided with convex edges which protrude upwards.

13. The self-balancing scooter according to claim 11, wherein the upper frames (2) are formed with grooves (25) which are concaved downwards, and the grooves (25) fit outer edges of the foot plates in shape; the upper frames (2) are also formed with second through holes (24); and fixing posts (22) for installing the circuit boards (3) are disposed on the lower surfaces of the upper frames (2).

14. The self-balancing scooter according to claim 10, wherein lower portions of the touch control portions (11) are flat.

15. The self-balancing scooter according to claim 10, wherein first elastic element abutting portions (12) are disposed around upper portions of the touch control portions (11).

16. The self-balancing scooter according to claim 10, wherein a cross-section of the upper portions of the touch control portions (11) is cross-shaped, T-shaped or circular.

17. The self-balancing scooter according to claim 10, wherein a periphery of the main body (10) is connected to a first convex edge (15) which protrude downwards; within a space defined by the first convex edge (15), a second convex edge (16) which protrudes downwards is disposed on the lower surface of the main body (1); and the touch control portions (11) are located within a space defined by the second convex edge (16).

18. The self-balancing scooter according to claim 10, wherein mounting posts (13) which protrude downwards are disposed on the lower surface of the main body (10), and threaded holes are formed in the mounting posts (13).

* * * * *